SEARCH ROOM

Nov. 9, 1965 H. B. ANDREW 3,217,251

ORTHOGONAL SPECTRAL ANALYSIS APPARATUS FOR MESSAGE WAVEFORMS

Filed Jan. 5, 1962

INVENTOR
H. B. ANDREW
BY Harry C. Hart
ATTORNEY 3,217,251

ORTHOGONAL SPECTRAL ANALYSIS APPARATUS FOR MESSAGE WAVEFORMS

Harold B. Andrew, Chatham, N.J., assignor to Bell Telephone Laboratories, Incorporated, New York, N.Y., a corporation of New York Filed Jan. 5, 1962, Ser. No. 165,068
8 Claims. (Cl. 324—77)

This invention deals with the analysis of message waves into their several frequency components and to the continuous display of the resulting spectra for visual examination.

The spectral analysis of message waves has in the past proceeded along one or the other of two different avenues of approach. According to the first approach, resolution—namely, the selection of each individual component frequency independently of the others—is obtained, as taught by Fourier, by turning to account the principles of orthogonality and orthonormality that hold among sinusoidal waves of different frequencies; i.e., the product of two sinusoidal waves, when integrated over a full cycle or an integral number of cycles, vanishes except in the particular case that their frequencies are alike. Hence, when a complex wave having components of a number of different frequencies is multiplied by a sine wave or a cosine wave of a single specified one of those frequencies and the product is integrated, the nonvanishing part of the integral is representative of the energy, in the one case of the cosine component and in the other case of the sine component of the message wave having the same specified frequency. By carrying out this process twice, first with a cosine wave and again with a sine wave, the coefficients of the cosine series and of the sine series, respectively, that together represent the message wave, may be developed.

This approach can be instrumented electrically as has been done, for example, in Long Patent 2,491,910 and in Guanella Patent 2,522,369. To this end the test waves must be generated in synchronism with the period of the message wave, else the process fails for lack of identity between the frequency of the test wave and that of at least one component of the message wave. The extraction of the period of a message wave presents serious difficulties and these difficulties carry over into spectral analysis by this approach.

Moreover, to obtain by this process a number of terms of the series of progressively increasing orders, either a like number of sine and cosine waves must be simultaneously provided, of different frequencies, or a single sine-cosine wave generator must be readjusted, after the determination of one pair of terms, in preparation for the determination of the next higher ordered pair, and the readjustment must be not only of the frequency of the test wave generator, but of the phase displacement between its two output waves, as well.

According to another approach, selection among the several components is accomplished by reactive network filters. As shown, for example, in L. Y. Lacy Patent 2,476,445 a bank of filters having contiguous pass bands may be employed to deliver, at their several output points and on a space separation basis, indications of the energies of those components of the message wave that fall within their pass bands. Instead, and to reduce the complexity of the apparatus, a so-called "heterodyne analyzer" may be employed as shown, for example, in L. Y. Lacy Patent 2,403,986. In apparatus of this character the message wave is first recorded, as on a magnetizable tape, and a segment of the record is then repeatedly reproduced or "played back," as by scanning it at high speed, to develop an accelerated or "time-compressed," and hence "frequency-expanded" wave that is related to the original message wave. The time-compressed wave is then modulated onto a sweep-frequency carrier so that modulation products, individually representative of the energies of the components of the message wave, occupy a range that embraces the midfrequency of a single analyzing filter; i.e., the frequency-expanded spectrum is shifted on the frequency scale. As the frequency of the carrier is swept, these modulation products pass across the midfrequency of the filter pass band in turn, so that the filter thus picks them out, nominally one by one, and delivers them for utilization or display on a time separation basis. Considerations of selectivity and resolution require that the pass band of the analyzing filter be narrow, in which case its response is slow. For continuous, contemporaneous analysis it is imperative that the response of the filter be rapid in which case its bandwidth tends to be so broad that resolution among components is lost. The design of the resolving filter thus requires a compromise between incompatible requirements.

The present invention avoids the necessity of making this compromise. It does so by resolving the individual components of the message wave according to the orthogonality principle and without resort to a filter network, necessarily reactive and hence slow to respond, in the path of the message wave. To this end it provides two test waves, namely, a sine wave and a cosine wave of the same preassigned frequency. These test waves are individually multiplied by the frequency-shifted, time-compressed counterpart of the message wave and the products are individually integrated, over a time interval that is long compared with a reproduction cycle, to provide, at two output points, an envelope of the amplitudes of the Fourier coefficients of the message wave sine series and those of its cosine series, respectively. It does this, furthermore, without the need of synchronism between the test wave generator and the original message wave under investigation. Instead, the test waves of the invention are synchronized with the reproduction operation by which the original message wave is converted into a time-compressed counterpart.

The invention is based, in part, on the recognition that the individual terms of the Fourier series expansion of the frequency-shifted, time-compressed counterpart wave are of frequencies that are harmonically related, not to the components of the original message wave, but to the reproduction frequency. Because this is constant, synchronization of the test wave generator with it presents no problem. Yet, because these harmonic components of the reproduction frequency varying amplitude in related conformance with the amplitudes of the components of the original message wave full, indeed nearly perfect, information as to the spectral constitution of the original message wave can be derived from them. This is particularly true in the case of chief practical importance, namely, the case in which the original message wave is not ideally periodic but changes continuously, though slightly, as time progresses and in which the record-bearing tape segment is advanced by a small distance between each reproduction and the next so that the successive reproductions differ slightly from each other.

It is a feature of the invention that the test waves are developed from a sequence of brief pulses, all alike and recurring regularly at the reproduction rate. It is known that the spectrum of such a pulse sequence comprises, over a substantial and sufficient portion of the frequency range, a series of components that are alike in magnitude and of frequencies equal to the reproduction frequency and its harmonics. By modulating the pulse train onto a swept frequency carrier, this spectral series is shifted on the frequency scale to the region occupied by the frequency-shifted, time-compressed counterpart of the message wave. A filter of fixed midband frequency now picks out the components of this spectrum, one by one. Since they are all alike in amplitude, the response time of the filter is not of primary importance. Hence, its pass band may be so narrow as to insure that not more than one such component can fall within it at any time. Such a narrow band filter effectually converts what it receives from the modulator into a sinusoidal wave of fixed frequency and of phase dependent on the instant of the reproduction cycle in which the pulses of the train are generated. Since the test wave is of fixed frequency, a static phase splitter may be employed to develop a second test wave in quadrature with the first test wave and of identical frequency; i.e., if the first test wave be a cosine wave, the second is a sine wave, as required for development of the coefficients of the cosine series and of the sine series, respectively, of the frequency-shifted, time-compressed counterpart of the original message wave.

The invention will be fully apprehended from the following detailed description of an illustrative embodiment thereof taken in connection with the appended drawings in which.

Figures 1, 2, 3, 4:
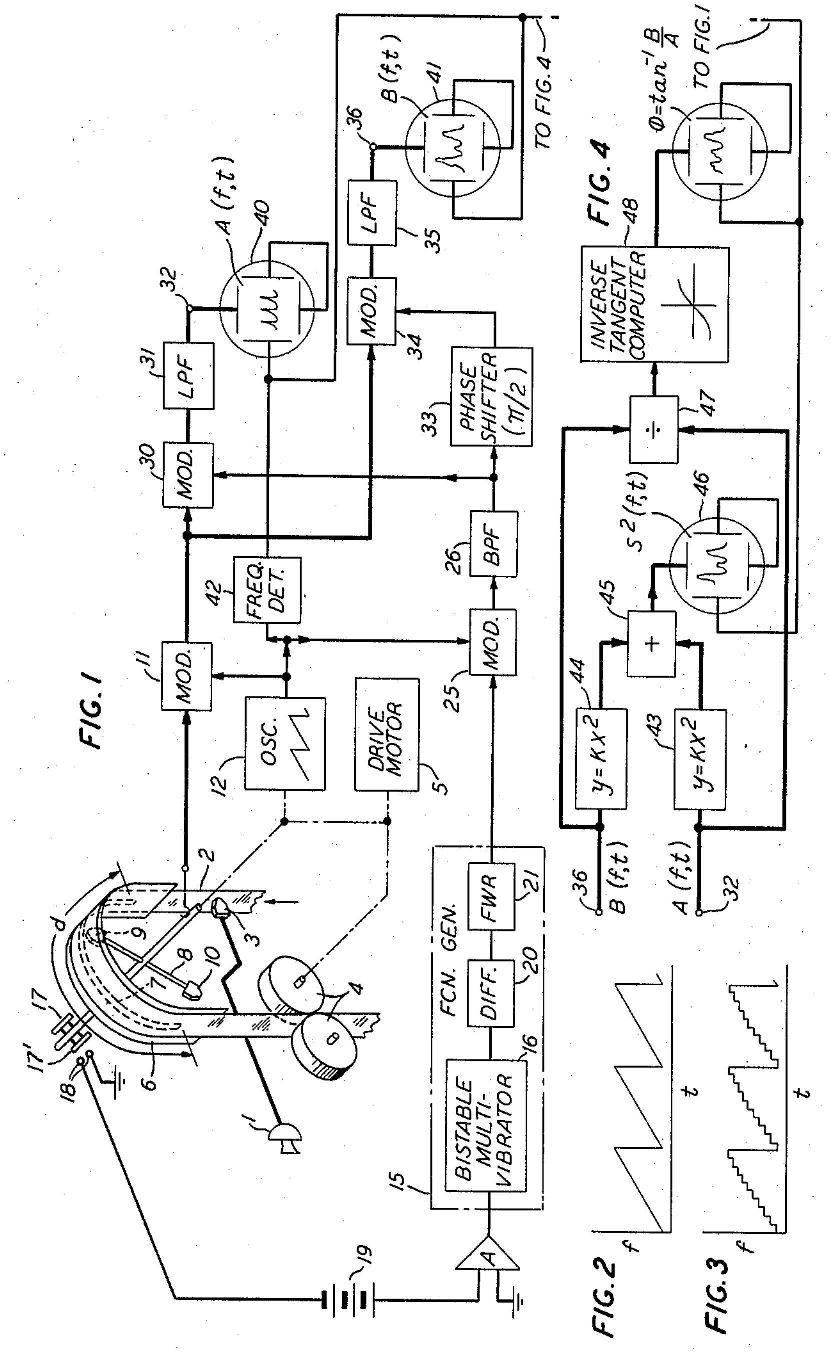
FIG. 1 is a schematic block diagram showing a wave analyzer in accordance with the invention.
FIGS. 2 and 3 are diagrams illustrating alternative ways in which the frequency of the oscillator of FIG. 1 may be varied.
FIG. 4 shows display apparatus alternative to the display apparatus of FIG. 1.

Referring now to the drawings, FIG. 1 shows the component elements of a system according to the invention in schematic form and indicates the sequence of operations. A signal to be analyzed originating, for example, in a microphone 1 is recorded on a suitable medium such as a magnetic tape 2 by a recording head 3 of known construction, past which the tape is advanced, e.g., by rollers 4 at a suitable slow speed under control of a motor 5. Placed immediately beyond the recording head is an arcuate track 6 over which the tape 2 travels. This track determines the geometrical length *d* of the tape segment 7 to be reproduced, and hence the duration T of that part of the original wave that is recorded on the segment *d*. The segment-defining track 6 is here shown as extending through 180 degrees or a semicircle and the reproducer 8 accordingly comprises two magnetic scanning heads 9, 10 mounted to be rotated by the motor 5 about an axis and located opposite to each other so as to scan the segment 7 and develop a time-variant counterpart of the recorded message wave segment. Thus, as one scanning head leaves the tape segment 7 the other head enters it. Accordingly, one head is in operation at all times. Other arrangements are equally suitable. For example, the tape segment might extend through an arc of 120 degrees or one-third of a circle in which case three equally spaced heads would be employed.

In accordance with known techniques, the track 6 over which the tape segment 7 passes may contain a central slot which extends for its full length and nearly its full width. The scanning heads 9, 10 may thus be brought into close proximity with the surface of the tape on which the signals are recorded.

Advantageously, the speed of reproduction is much greater than the recording speed so that a number, for example one hundred, of consecutive reproductions, each occupying a period $\tau$, are developed by the scanner 8 during the period T in which the record-bearing tape 2 advances from one end of the segment-defining track 6 to the other. Advantageously, too, the speed ratio is not only large but integral; i.e., in the illustration, $$\tau = \frac{T}{100}$$

The outputs of the heads 9, 10 of the scanner 8, connected in series or in parallel, are fed to a modulator 11 of known construction to which is also fed a carrier wave derived from an oscillator 12. This oscillator 12 is of the sweep frequency variety; i.e., its output frequency changes, in the course of each single segment period T, from the lower limit of its range to the upper limit and thereupon returns abruptly to its lower limit to repeat the sweep cycle. With appropriate selection of these two limits and in view of this identity between the duration of the frequency sweep cycle and the message wave segment duration T, and especially with the foregoing integral relation between this period T and the reproduction period $\tau$ the oscillator frequency changes, between each reproduction and the next, by an increment $1/\tau$.

The sweep of the oscillator frequency may be instrumented in well-known fashion by means, for example, of a rotary tuning condenser. If the frequency alteration throughout the course of each single sweep cycle is continuous, the oscillator frequency varies in sawtooth wave fashion, as shown in FIG. 2.

As a refinement, the oscillator frequency may be altered, as shown in FIG. 3 in steps and dwells, following a staircase wave having a number of steps equal to the number of successive reproductions of the record that take place as the tape moves through the distance *d*, the length of the tape segment scanned, each step differing from its predecessor by the frequency $1/\tau$. In either case the frequency sweep of the carrier oscillator is advantageously synchronized with the reproducer, i.e., by rotation of its tuning condenser by the driving motor 5, so that an exact integral number, for example one hundred, of reproductions take place in the course of a single full cycle of the frequency sweep, and hence in the course of the segment period T.

Below the recorder-reproducer apparatus there is shown a component 15 labeled "Function Generator." It is the purpose of this component to deliver a wave in synchronism with the reproduction operation and of a character such that its spectrum consists of a number of discrete components, all harmonically related, and a sufficient number of which are all of like amplitudes. One wave having such a spectrum consists of a sequence of brief pulses, recurring regularly at intervals $\tau$. As shown, for example, in "Radio Engineers' Handbook," by F. E. Terman (McGraw-Hill, 1943), pages 21 and 22, the spectrum of such a pulse sequence consists of an infinite series of components. Provided the duration of each pulse is short compared with the interpulse interval the low order components, starting with the first or fundamental component, are substantially alike in amplitude, and the number of like-amplitude components that occur before their amplitudes commence to diminish may be made as large as desired by keeping the ratio between the pulse duration and the interpulse interval small. When the origin of time is taken at the midpoint of one such pulse, the series of components may be expressed as a cosine series.

Such a train of brief pulses can readily be generated in a variety of ways. For example, the function generator may comprise a conventional bistable multivibrator 16 that is tripped from each of its stable states to the other under the influence of a driving pulse derived from, and synchronized with, the reproducing scanner 8. To this end conductors 17, 17' fixed to and insulated from the shaft of the reproducing scanner 8 may interconnect two auxiliary contacts 18 as they pass them, twice in each revolution of the scanner 8 thus momentarily to apply the voltage of an auxiliary battery 19 to the multivibrator 16 and switch it, twice for each revolution of the scanner 8, from its first stable state to its second stable state. The multivibrator 16 supplies its output to a differentiator which delivers a sequence of brief pulses or "spikes" of alternately opposite polarities, two for each revolution of the scanner 8. A full wave rectifier 21 inverts the negative pulses, leaving the positive ones unchange, thus to deliver a sequence of brief pulses, all alike, in exact synchronism with the rotation of the scanner 8 and in phase dependent on the location, within the track 6, of the contacts 18. The exact synchronism between the generation of the pulses and the rotation of the reproducing scanner 8 ensures that the separation, on the frequency scale, of each component of the pulse spectrum from its predecessor shall be precisely $1/\tau$.

In accordance with the invention the train of output pulses thus generated is applied to one input point of a modulator 25 to whose other input point the output of the sweep-frequency oscillator 12 is applied. The result of the modulation process is to shift the spectral components of the output of the function generator 15 on the frequency scale and, as the oscillator frequency is altered by $1/\tau$ between each reproduction and the next, to cause the modulation products to pass a fixed frequency in regular succession. A bandpass filter 26, connected to the output terminal of the modulator 25, is so proportioned that its midband frequency coincides with a preassigned multiple of the reproduction frequency past which the modulation products are thus swept, and it operates to pick them from the series, one by one. Inasmuch as they are all alike in magnitude, this filter 26 is not required to respond to magnitude changes. Inasmuch as each one is replaced by its successor in the pass band of the filter 26 in synchronism with the successive reproductions, the filter 26 is not required to respond to frequency changes. Hence, its bandwidth may be so narrow as easily to exclude all frequency components but one. With such a narrow pass band the output of the filter 26 is essentially sinusoidal in character. When the origin of time is taken at the instant of the generation of any single pulse output from the function generator 15, the filter output may be accurately described as a cosine wave of the preassigned midland frequency of the filter.

In accordance with the invention this cosine test wave is applied to one input point of a modulator 30 while the entire time-variant counterpart wave, namely, the output of the modulator 11, is applied to the other input point of the modulator 30. This modulator 30 acts to multiply the entire time-variant counterpart wave by the sinusoidal test wave. The output of the modulator 30 is passed through a low-pass filter 31 which integrates the modulation products to deliver the integral at a first output point 32. As is well known, the integral of the product of such a test wave by the entire time-variant counterpart wave, if taken over an integral number of full cycles, vanishes except in the case of a component of the counterpart wave that is identical in frequency and coincident in phase with the test wave, in which case the magnitude of the integral is that of a single term of the cosine series expansion of the counterpart wave. Because carrying out the integration over an exact number of full cycles presents practical difficulties, the low-pass filter 31 is so proportioned that its cutoff frequency lies well below the lowest frequency component of interest. As a safety measure, its cutoff frequency preferably lies well below the frequency $1/\tau$. When it is proportioned in this fashion it carries out the integration over a large number of full periods $\tau$, with perhaps an undefined fraction of a period in addition. When the number of full periods is large, the influence of the fractional period is negligible.

The lowest frequency component of the time-compressed counterpart wave is $1/\tau$, i.e., the reciprocal of the reproduction period, and all of its components are spaced apart by the same frequency $1/\tau$. Because the reproducer 8 picks up from the tape record segment 7, in the course of each scan, all of the components of the original message wave that are contained in the tape segment of length *d*, the amplitudes of the harmonic components of the frequency-shifted, time-compressed counterpart wave, likewise spaced apart on the frequency scale by $1/\tau$, are individually representative of the amplitudes of the most nearly similar component frequencies of the original message wave. Hence the output of the low-pass filter 31 is, for all practical purposes, the envelope of the cosine series expansion of the original message wave.

This cosine series does not by itself contain all information as to the spectral constitution of the wave being analyzed. But after the development, in similar fashion, of a related signal representing the envelope of the corresponding sine series, the two envelopes together do indeed contain all the necessary information. In accordance with the invention, therefore, the cosine wave output of the bandpass filter 26 is shifted in phase by one-quarter cycle, as by a phase shifter 33 whose output can then be accurately expressed as a sine wave of the specified midband frequency of the filter 26. This sine wave is applied to one input point of a modulator 34 to whose other input point the entire frequency-shifted, time-compressed counterpart wave is applied and the output of the modulator 34 is integrated over a large number of full cycles by a low-pass filter 35 which may be identical with the filter 31 to provide, at a second output point 36, the envelope of the sine series. These two outputs, taken together, are precisely representative of the spectral constitution of the original message wave.

These outputs may be utilized in various ways. For example, they may be individually displayed on frequency scales on the faces of individual oscilloscopes 40, 41. Thus, for example, a voltage proportional to the output of the sawtooth sweep oscillator 12, developed by a frequency detector or discriminator 42, is applied to the horizontal deflecting elements of both of these oscilloscopes while the cosine series envelope wave $A(f,t)$ is applied from the output point 32 to the vertical elements of the first oscilloscope 40 and the sine series envelope wave $B(f,t)$ is applied from the output point 36 to the vertical deflecting elements of the second oscilloscope 41. If it is preferred to exhibit the energy spectrum and the phase spectrum of the message wave independently, the cosine series envelope A and the sine series envelope B may be applied as shown in FIG. 4 to devices 43, 44 having like square law characteristics, e.g., vacuum tubes having appropriate current voltage characteristics and appropriately biased. The squared outputs may then be additively combined, as by an adder 45 to deliver to the vertical deflection elements of a third oscilloscope 46 a signal $S^2(f,t)=B^2+A^2$ which is truly representative of the energy spectrum of the original message wave. Similarly the two output waves may be applied to the two input points of a divider 47 and the quotient $B/A$ thus formed may be applied to a unit 48 having a characteristic, as shown, which closely resembles the inverse tangent curve. The output of this unit 48 thus continuously represents, to a good approximation, the angle whose tangent is the quotient of the momentary magnitude of the sine envelope signal by the cosine envelope signal. A suitable inverse tangent computer is shown on page 177 of "Principles of Analog Computation," by G. W. Smith, and R. C. Wood (McGraw-Hill, 1959). The inverse tangent characteristic is closely similar to that of the volume compressor of Bedford Patent 2,266,531 and may be instrumented in the same way. Dividers of several kinds are described in "Electronic Analog Computers," by G. A. Korn and T. M. Korn (McGraw-Hill, 1952). Instrumentalities for carrying out logarithmic divisions are disclosed in H. L. Barney Patent 2,576,249 and G. Raisbeck Patent 2,908,761.

Various instrumentalities other than those selected for illustration and operative interconnections among them by which the invention may be practised will suggest themselves to those skilled in the art.

What is claimed is:

1. Apparatus for analyzing a complex wave which comprises means for making a space-variant record of said wave, means for repeatedly scanning a segment of said record, of duration T, at a high speed in each of a succession of $n$ intervals, each of duration $$\tau = \frac{T}{n}$$

to develop a time-variant wave comprising a sequence of accelerated reproductions of that portion of the original complex wave which occupies said record segment, said time-variant wave having a spectrum that is expanded, on the frequency scale, as compared with the spectrum of the original wave, the frequencies of the several components of said spectrum being $1/\tau$, $2/\tau$, $3/\tau$, . . . $n/\tau$, each said spectrum component having an energy that is related to the energy of an original wave component, a source of an oscillation of frequency variable through the range $$f_0 \text{ to } f_0 + \frac{n}{\tau}$$

heterodyne means incuding said oscillation source for translating said expanded spectrum to said range, means for varying the frequency of said oscillation by an increment $1/\tau$ between each scan and the next and for repeating said variation $n$ times in the course of $n$ of said intervals thereby, on successive scans, to bring successive components of the translated, expanded spectrum to a preassigned frequency within said range, means for developing a first sinusoidal test wave of said preassigned frequency, means for developing a second sinusoidal test wave of said preassigned frequency in quadrature with said first test wave, means for independently modulating said translated wave by said test waves to develop first and second product waves, a first low-pass filter of cutoff frequency less than $1/\tau$ for passing to a first output point only low frequency components of said first product wave, a second low-pass filter of cutoff frequency less than $1/\tau$ for passing to a second output point only low frequency components of said second product wave, and means for utilizing the waves appearing at said first and second output points, to provide two indications that are together completely representative of the spectral character of the original complex wave.

2. Apparatus as defined in claim 1 wherein said test-wave development means comprises means, synchronized with said record-scanning means, for developing a train of brief pulses repeated at regular intervals $\tau$ whose spectrum is constituted of a multiplicity of components of substantially like amplitudes spaced apart on the frequency scale at intervals $1/\tau$, means for modulating said pulse train by the oscillations of said variable frequency source, thereby to shift its spectrum to a location on the frequency scale that moves in coordination with the variations of the frequency of said oscillation source, a bandpass filter of midband frequency equal to said preassigned frequency and of bandwidth no greater than $1/\tau$ for selecting the components of said frequency-shifted pulse train spectrum, one by one, to provide said first test wave, and phase-splitter means for shifting the phase of said first test wave to provide said second test wave.

3. Apparatus for analyzing a complex wave which comprises means for making a space-variant record of said wave, means for repeatedly scanning a segment of said record at a high speed in each of a succession of intervals of duration $\tau$ to develop a time-variant wave, heterodyne means including a variable frequency oscillation source for translating the several components of the spectrum of said time-variant wave, in turn, to a preassigned frequency, means for developing first and second sinusoidal test waves of said preassigned frequency and in phase quadrature, means for independently modulating said translated wave by said test waves to develop first and second modulation product waves, first and second low-pass filters of cutoff frequencies less than $1/\tau$ for passing to a first and to a second output point, respectively, only low frequency components of said first and second product waves, and means for utilizing the waves appearing at said first and second output points, to provide two indications that are together completely representative of the spectral character of the original complex wave.

4. Apparatus as defined in claim 3 wherein said test-wave developing means comprises means, synchronized with said record-scanning means, for developing a train of brief pulses repeated at regular intervals $\tau$ whose spectrum is constituted of a multiplicity of components of substantially like amplitudes spaced apart on the frequency scale at intervals $1/\tau$, heterodyne means including said variable frequency oscillation source for translating each component of said pulse train spectrum, in turn, to said preassigned frequency, a bandpass filter of midband frequency equal to said preassigned frequency and of bandwidth no greater than $1/\tau$, for selecting the components of said translated pulse train spectrum, one by one, to provide said first test wave, and phase-splitter means for shifting the phase of said first test wave to provide said second test wave.

5. Apparatus for analyzing a complex wave which comprises means for making a space-variant record of said wave, means for repeatedly scanning a segment of duration T of said record at a high speed in each of a succession of intervals, each of duration $$\tau = \frac{T}{n}$$

to develop a time-variant wave, heterodyne means including an oscillation source of frequency that is cyclically varied throughout a range in a period T for translating each component of the spectrum of said time-variant wave, in turn, to a preassigned frequency, means for developing first and second sinusoidal test waves of said preassigned frequency and in phase quadrature, means for independently modulating said translated wave by said test waves to develop first and second modulation product waves, first and second low-pass filters of cutoff frequencies less than $1/\tau$ for passing to a first and to a second output point, respectively, only low frequency components of said first and second product waves, and means for utilizing the waves appearing at said first and second output points, to provide two indications that are together completely representative of the spectral character of the original complex wave.

6. Apparatus as defined in claim 3 wherein said utilization means comprises two oscilloscopes each having a horizontally and vertically deflectable indicator, means for deflecting the indicators of both said oscilloscopes in the horizontal direction in proportion to the momentary frequency of said sweep frequency oscillator, means for vertically deflecting the indicator of said first oscilloscope in proportion to the wave developed at said first output point, and means for vertically deflecting the indicator of said second oscilloscope in proportion to the wave developed at said second output point.

7. Apparatus as defined in claim 3 wherein said utilization means comprises means for independently squaring the waves developed at said first and second output points, means for additively combining said squares, and means including an oscilloscope for displaying the combination of said squares on a frequency scale.

8. Apparatus as defined in claim 3 wherein said utilization means comprises means for forming the quotient of the wave developed at said second output point by the wave developed at said first output point, an inverse tangent computer having an input point and an output point, means for applying said quotient to said input point, and means including an oscilloscope for displaying the wave appearing at the output point of said computer on a frequency scale.

References Cited by the Examiner

UNITED STATES PATENTS

| | | | |
|---|---|---|---|
| 2,522,369 | 9/50 | Gaunella | 324—77 |
| 3,021,478 | 2/62 | Meacham | 324—77 |
| 3,035,231 | 5/62 | Neelands. | |
| 3,045,180 | 7/62 | Losher | 324—77 |
| 3,096,479 | 7/63 | Marks et al. | 324—77 |

OTHER REFERENCES

The Cathode Ray Sound Spectroscope, article in The Journal of the Acoustical Society of America, September 1947, pages 527–537.

WALTER L. CARLSON, *Primary Examiner.*